(12) United States Patent
Kim et al.

(10) Patent No.: US 8,666,004 B2
(45) Date of Patent: Mar. 4, 2014

(54) METHODS AND SYSTEMS FOR HYBRID MIMO SCHEMES IN OFDM/A SYSTEMS

(75) Inventors: Je Woo Kim, Cupertino, CA (US); Jong Hyeon Park, San Jose, CA (US); Tae Ryun Chang, Santa Clara, CA (US); Ju Won Park, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1252 days.

(21) Appl. No.: 12/124,955

(22) Filed: May 21, 2008

(65) Prior Publication Data
US 2009/0290618 A1    Nov. 26, 2009

(51) Int. Cl.
*H04L 1/02*    (2006.01)
(52) U.S. Cl.
USPC ......................................................... 375/347
(58) Field of Classification Search
USPC .......... 375/259, 260, 267, 316, 346, 347, 349
See application file for complete search history.

(56) References Cited

U.S. PATENT DOCUMENTS

| | | | | |
|---|---|---|---|---|
| 6,081,566 | A * | 6/2000 | Molnar et al. | 375/347 |
| 6,128,355 | A * | 10/2000 | Backman et al. | 375/347 |
| 6,215,814 | B1 * | 4/2001 | Ylitalo et al. | 375/148 |
| 6,298,092 | B1 * | 10/2001 | Heath et al. | 375/267 |
| 6,470,192 | B1 * | 10/2002 | Karlsson et al. | 455/561 |
| 2002/0090948 | A1 * | 7/2002 | Nagata | 455/437 |
| 2003/0053524 | A1 * | 3/2003 | Dent | 375/148 |
| 2007/0115864 | A1 | 5/2007 | Bar-Ness et al. | |
| 2009/0213955 | A1 | 8/2009 | Higuchi et al. | |

FOREIGN PATENT DOCUMENTS

| | | |
|---|---|---|
| CN | 1263653 A | 8/2000 |
| CN | 1829119 A | 9/2006 |
| CN | 101171781 A | 4/2008 |
| EP | 1503519 A1 | 2/2005 |
| EP | 1858175 | 11/2007 |
| EP | 1865642 | 12/2007 |
| JP | 5206907 A | 8/1993 |
| JP | 2002508898 A | 3/2002 |
| JP | 2007028569 A | 2/2007 |
| RU | 2192094 | 10/2002 |
| RU | 2305898 C2 | 9/2007 |
| WO | WO9853560 A1 | 11/1998 |

OTHER PUBLICATIONS

International Search Report and Written Opinion—PCT/US2009/043651, International Search Authority—European Patent Office—Oct. 15, 2009.
Taiwan Search Report—TW098115888—TIPO—Jun. 27, 2012.

* cited by examiner

*Primary Examiner* — Sam K Ahn
*Assistant Examiner* — Vineeta Panwalkar
(74) *Attorney, Agent, or Firm* — Tyler J. Overall

(57) ABSTRACT

Certain embodiments of the present disclosure provide a hybrid receiver diversity scheme that involves combining received signals in accordance with a combination of multiple receive diversity schemes. Certain embodiments of the present disclosure provide a hybrid transmit diversity scheme that involves transmitting diversity signals to a receiver according to a transmit diversity scheme selected based on signal quality measurements received from the receiver.

23 Claims, 14 Drawing Sheets

METHODS AND SYSTEMS FOR HYBRID MIMO SCHEMES IN OFDM/A SYSTEMS

FIELD OF THE DISCLOSURE

The present disclosure relates generally to wireless communication systems. More specifically, the present disclosure relates to methods and apparatus for measuring signal quality in wireless communication systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

In some cases, such systems may utilize multiple antennae at the transmitting base station and/or a mobile station to provide multiple signal paths. Some type of combining circuit typically combines or selects the signals from the receiver antennas in an effort to achieve an improved quality signal. Examples of such schemes include a maximum ratio combining (MRC) scheme and a beam-forming scheme. While the beam forming scheme typically yields significant improvements in interference-dominated communications channels, the MRC scheme typically yields significant improvements in noise-dominated communications channels.

Unfortunately, conventional combining circuits implement only a single type of combining scheme that may not yield significant improvements in signal quality over both noise-dominated and interference-dominated communications channels.

SUMMARY

Figure 1:
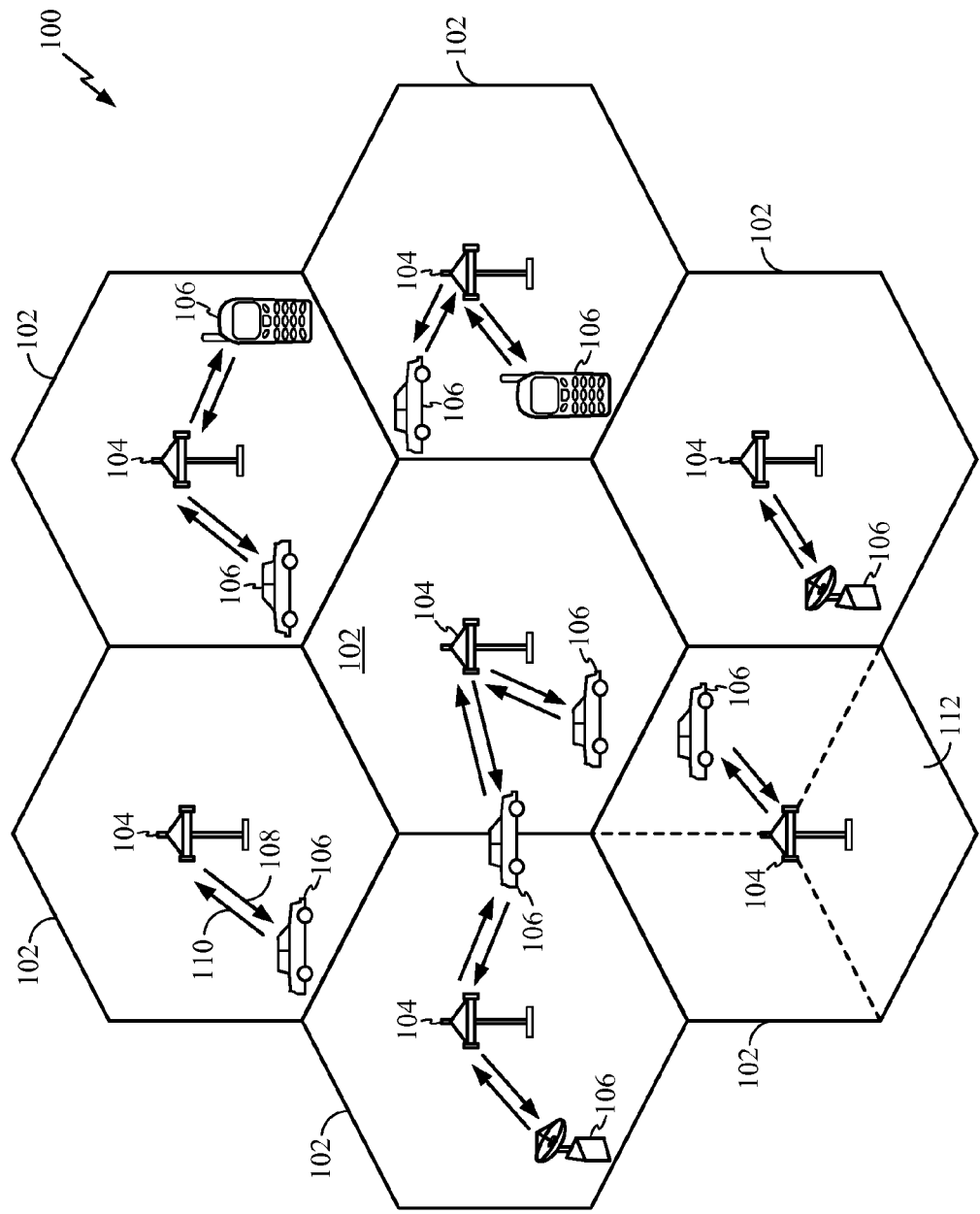
FIG. 1 illustrates an example of a wireless communication system.

Certain embodiments provide a method, a receiver, an apparatus, and a mobile device for performing hybrid receiver processing.

The method generally includes receiving first and second signals from a transmitter with two different antennas, combining the first and second signals using a first diversity combining scheme to generate a first combined signal, combining the first and second signals using a second diversity combining scheme to generate a second combined signal, and generating a hybrid combined signal as a function of the first and second combined signals.

Certain embodiments provide a method, a transmitter, and an apparatus for performing hybrid transmit processing.

The method generally includes receiving one or more signal quality measurements from a receiver and transmitting hybrid transmit diversity signals to the receiver according to one of first and second transmit diversity schemes, as selected based on the signal quality measurements.

DETAILED DESCRIPTION

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standard-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology, together referred to as OFDM/A technology or OFDM/A systems. OFDM is a digital multi-carrier modulation technique that has recently found wide adoption in a variety of high-data-rate communication systems. With OFDM, a transmit bit stream is divided into multiple lower-rate sub-streams. Each sub-stream is sent over one of a plurality of parallel sub-channels. OFDMA is a multiple access technique in which users are assigned to different sub-carriers over different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages like modulation efficiency, spectrum efficiency, flexibility, and strong multipath immunity with relatively simple equalizer over conventional single carrier modulation schemes.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system 100.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDM/OFDMA system 100 may utilize antennas that concentrate the flow of power within a particular sector 112 of the cell 102. Such antennas may be referred to as directional antennas.

Figure 2:
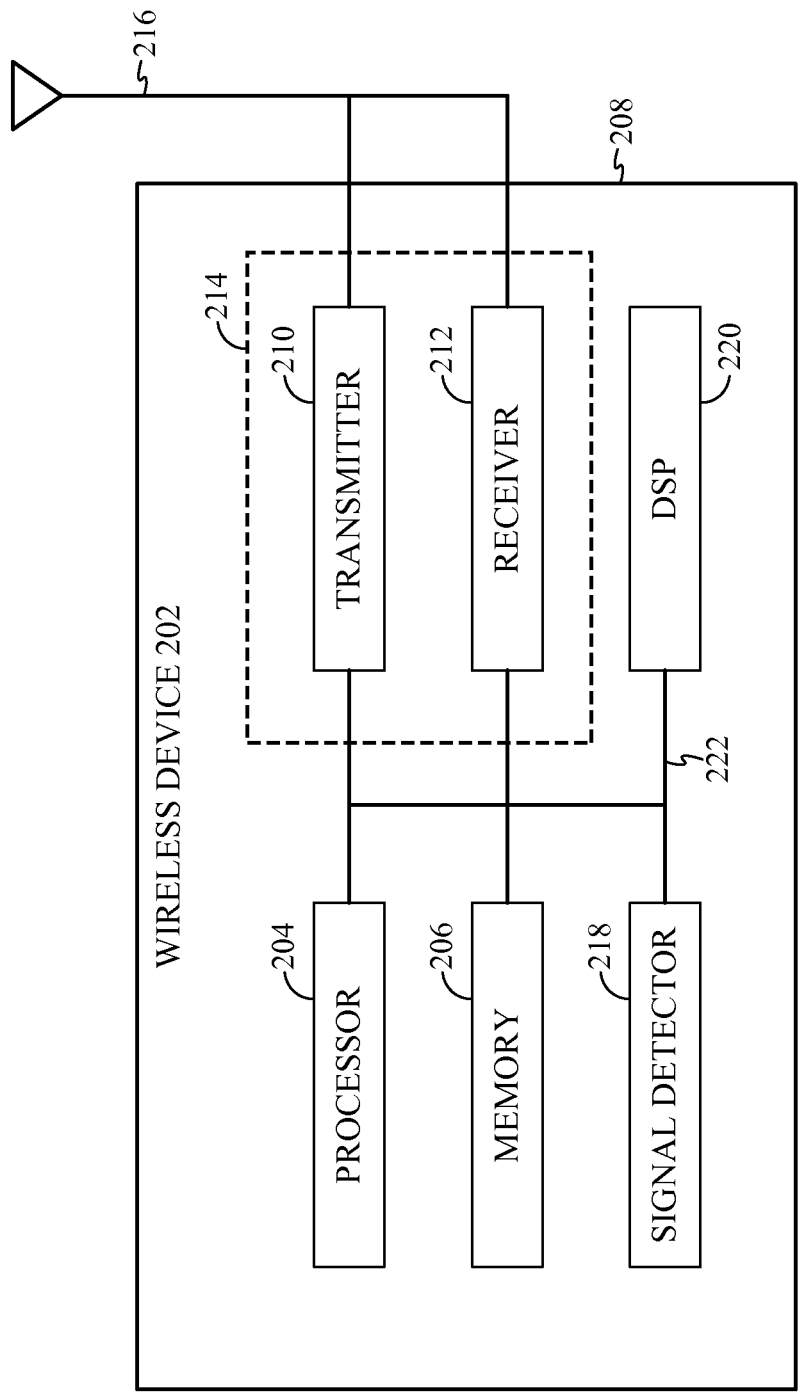
FIG. 2 illustrates examples of various components that may be utilized in a wireless device using OFDM or OFDMA method.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers and/or multiple antenna.

The wireless device 202 may also include a signal detector 218 that may be used to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222 which may include a power bus, a control signal bus, and a status signal bus in addition to a data bus. However, for the sake of clarity, the various busses are illustrated as the bus system 222.

Figure 3:
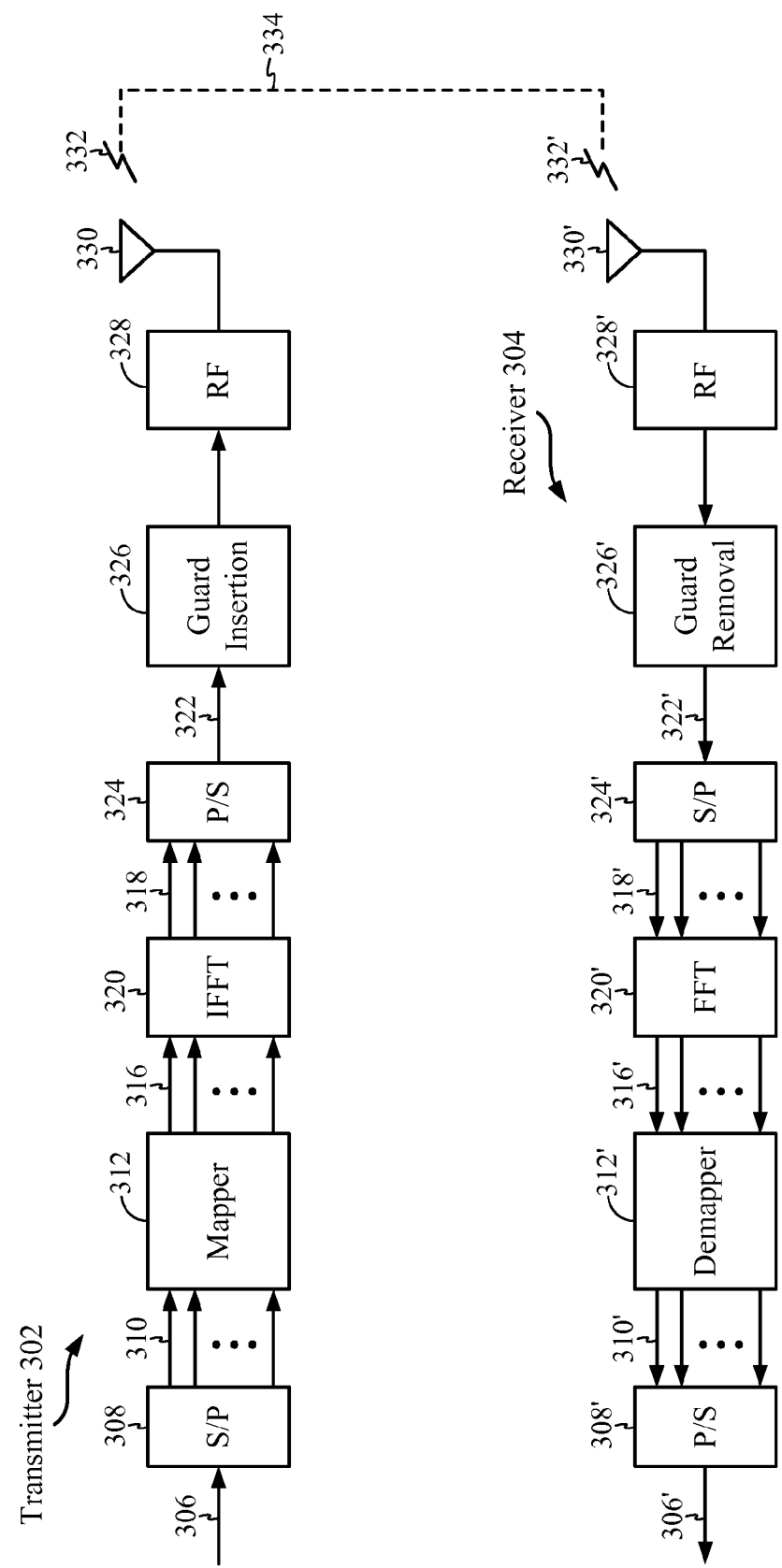
FIG. 3 illustrates an example of a transmitter and an example of a receiver that may be used within a wireless communication system that utilizes orthogonal frequency division multiplexing (OFDM) and orthogonal frequency divisional multiple access (OFDMA)

FIG. 3 illustrates an example of a transmitter 302 that may be used within a wireless communication system 100 that utilizes OFDM/OFDMA. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 splits the transmission data into N parallel data streams 310.

The N parallel data streams 310 may then be provided as input to a mapper 312. The mapper 312 maps the N parallel data streams 310 onto N constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 312 outputs N parallel symbol streams 316, each symbol stream 316 corresponding to one of the N orthogonal sub-carriers of the inverse fast Fourier transform (IFFT) 320. These N parallel symbol streams 316 are represented in the frequency domain, and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. The receiver 304 may be implemented in a user terminal 106 for receiving data 206 from a base station 104 on a downlink 108. The receiver 304 may also be implemented in a base station 104 for receiving data 306 from a user terminal 106 on an uplink 110.

The transmitted signal 332 is shown traveling over a wireless channel. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal sub-carriers. A fast Fourier transform (FFT) component 320' converts the N parallel time-domain symbol streams 318' into the frequency domain, and outputs N parallel frequency-domain symbol streams 316'.

A demapper 312' performs the inverse of the symbol mapping operation that was performed by the mapper 312, thereby outputting N parallel data streams 310'. A P/S converter 308' combines the N parallel data streams 310' into a single data stream 306'. Ideally, this data stream 306' corresponds to the data 306 that was provided as input to the transmitter 302.

Hybrid MIMO RX Diversity Scheme

Certain embodiments of the present disclosure provide a hybrid approach to receiver diversity that utilizes different diversity combining techniques. Combined signals generated using the different techniques may be combined in a manner that is dependent on signal quality characteristics. As an example, if a signal quality parameter for a particular subcarrier is better (e.g., higher CINR) using one technique than the other, the combined signal generated using the technique that resulted in the better signal quality parameter may be weighted more heavily when generating the hybrid combined signal.

As another example, if signal quality indicates interference-dominant channel characteristics, the combined signal generated by beam forming may be given more weight in the hybrid combined signal. Conversely, if signal quality indicates noise-dominant channel characteristics, the combined signal generated by MRC may be given more weight in the hybrid combined signal.

Figure 4:
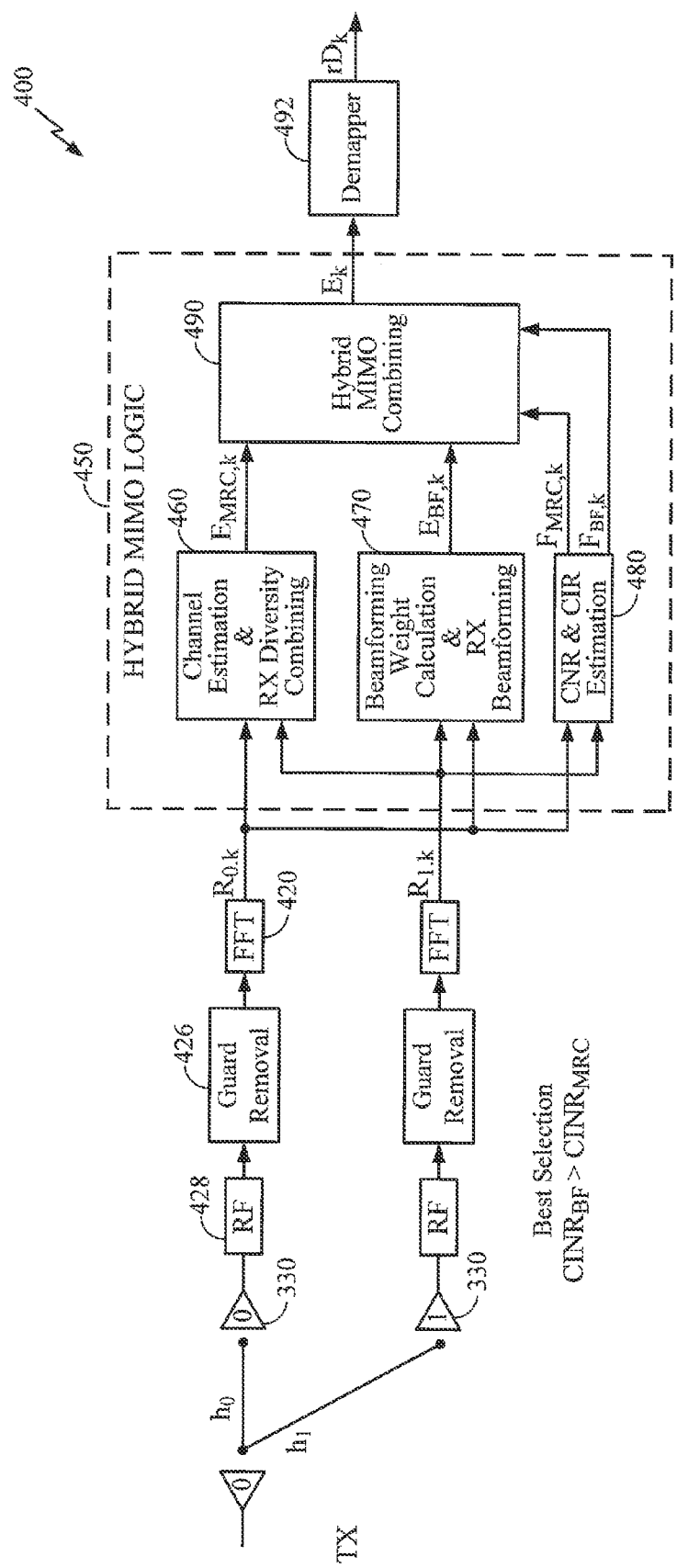
FIG. 4 illustrates an example receiver capable of performing hybrid receive diversity operations in accordance with certain embodiments of the present disclosure.

While the receiver shown in FIG. 3 utilizes a single receive antenna, some receivers may utilize multiple receive antennas in an effort to improve signal quality by combining signals received along multiple paths. FIG. 4 illustrates an example of such a receiver 400 that utilizes receive diversity to increase signal quality in accordance with certain embodiments.

In the illustrated example, a transmitter has a single antenna, while the receiver 400 has two antennas 330 (Antenna 0 and Antenna 1). Those skilled in the art will recognize, however, that the techniques described herein may apply in systems utilizing multiple transmit antennas and/or more than two receive antennas.

In the receiver, RF logic 428, guard removal logic 426, and FFT logic 420 along each Antenna 0 and Antenna 1 path processes the incoming signal, generating frequency domain received signals $R_{0,k}$ and $R_{1,k}$ (k=1, ..., N). The receiver 400 includes combining logic 450 that utilizes a hybrid approach to combining the frequency domain received signals to generate final combined signal $E_k$. The combining logic 450 may include logic for generating a "hybrid" combined signal based on a plurality of different combining techniques.

For example, the combining logic 450 may include RX diversity combining logic 460 to generate a combined signal $E_{MRC,K}$ utilizing a maximum ratio combining (MRC) scheme as well as beam forming logic 470 to generate a combined signal $E_{BF,K}$ utilizing a beam forming scheme. Hybrid combining logic 490 may generate a final combined signal $E_K$ based on the different combined signals generated utilizing the different combining techniques.

Figure 5:
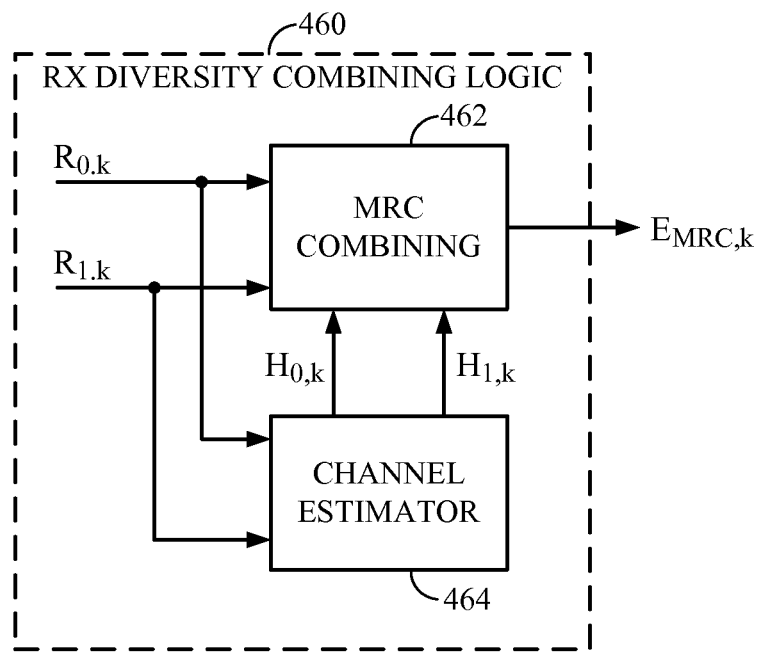
FIG. 5 illustrates an example of maximum ratio combining (MRC) logic.

As illustrated in FIG. 5, RX diversity combining logic 460 may include channel estimation logic 464. Channel estimation logic 464 may perform channel estimation in any suitable manner, for example, using pilot tones at known subcarriers and interpolation processes. As illustrated, channel estimation logic 464 may generate channel estimates for both antenna paths:

$H_{0,k}$=Estimated channel for channel $h_0$,k=1, ... ,N $H_{1,k}$=Estimated channel for channel $h_1$,k=1, ... ,N       Eq. 1

RX diversity combiner 462 may utilize these channel estimates to combine the two received signal R0,k and R1,k to generate the combined signal EMRC,K. EMRC,K may be generated using any suitable technique, such as an MRC equation:

$$E_{MRC,k} = \begin{cases} \dfrac{R_{0,k} \times H_{0,k}^* + R_{1,k} \times H_{1,k}^*}{|H_{0,k}|^2 + |H_{1,k}|^2}, & \text{if } k \text{ is used subcarrier} \\ 0, & \text{else} \end{cases}$$

$$k = 1, \ldots, N$$

Eq. 2

Figure 6:
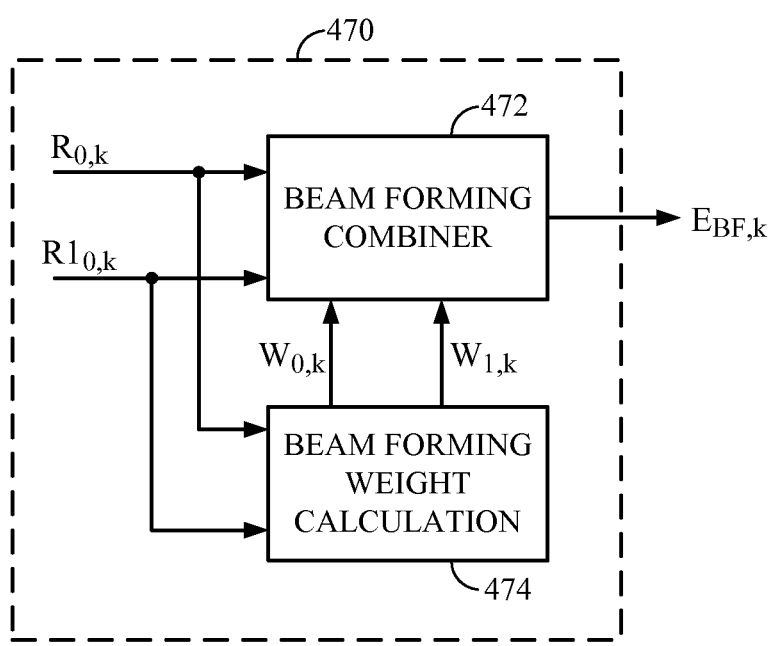
FIG. 6 illustrates an example of beam forming (BF) combining logic.

As illustrated in FIG. 6, beam forming combining logic 470 may include beam forming weight calculation logic 474. Beam forming weight calculation logic 474 may generate a set of beam forming weights $W_{0,k}$ and $W_{1,k}$:

$W_{0,k}$=Weight for channel 0 path,k=1, ... ,N $W_{1,k}$=Weight for channel 2 path,k=1, ... ,N       Eq. 3

Beam forming diversity combiner 472 may utilize these beam forming weights to combine the two received signal $R_{0,k}$ and $R_{1,k}$ to generate the combined signal $E_{BF,K}$. $E_{BF,K}$ may be generated using any suitable technique, such as the following equation:

$$E_{BF,k} = \begin{cases} R_{0,k} \times W_{0,k} + R_{1,k} \times W_{1,k} & \text{if } k \text{ is used subcarrier} \\ 0, & \text{else} \end{cases}, \quad \text{Eq. 4}$$
$$k = 1, \ldots, N$$

Figure 7:
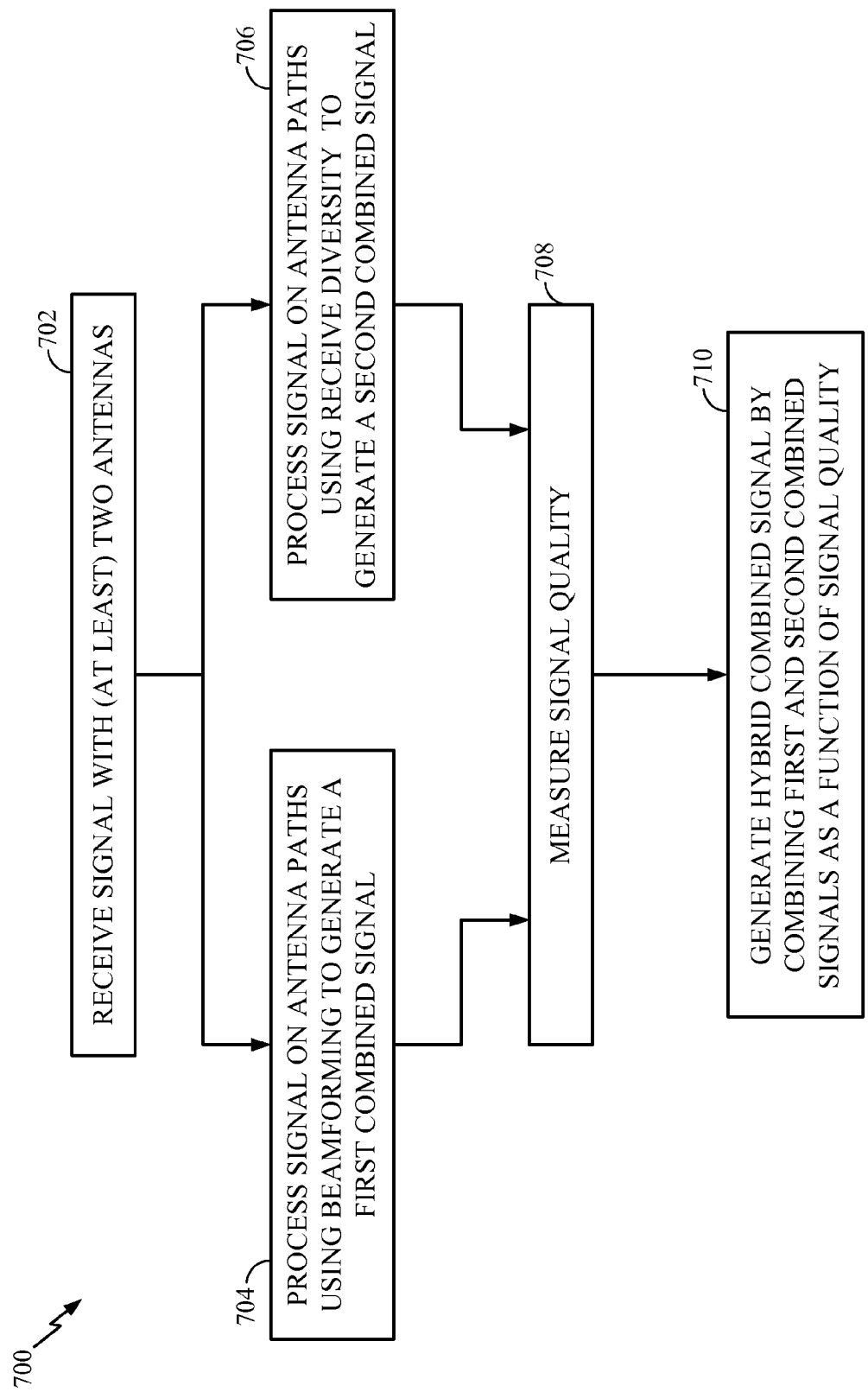
FIG. 7 illustrates example operations for hybrid receive diversity processing in accordance with certain embodiments of the present disclosure.

FIG. 7 illustrates example operations for generating a hybrid combined signal, for example, based on $E_{MRC,k}$ and $E_{BF,k}$, in accordance with certain embodiments of the present disclosure. The operations may be performed, for example, by the logic components illustrated in FIG. 4.

The operations 700 begin, at 702, by receiving a signal with at least two antennae. At 704 and 706, the received signals are separately processed using beam forming and receive diversity (e.g., MRC) techniques, respectively, to generate first and second combined signals. At 708, signal quality is measured and, at 710, a hybrid combined signal is generated by combining the first and second combined signals as a function of the signal quality measurement.

Figure 7A:
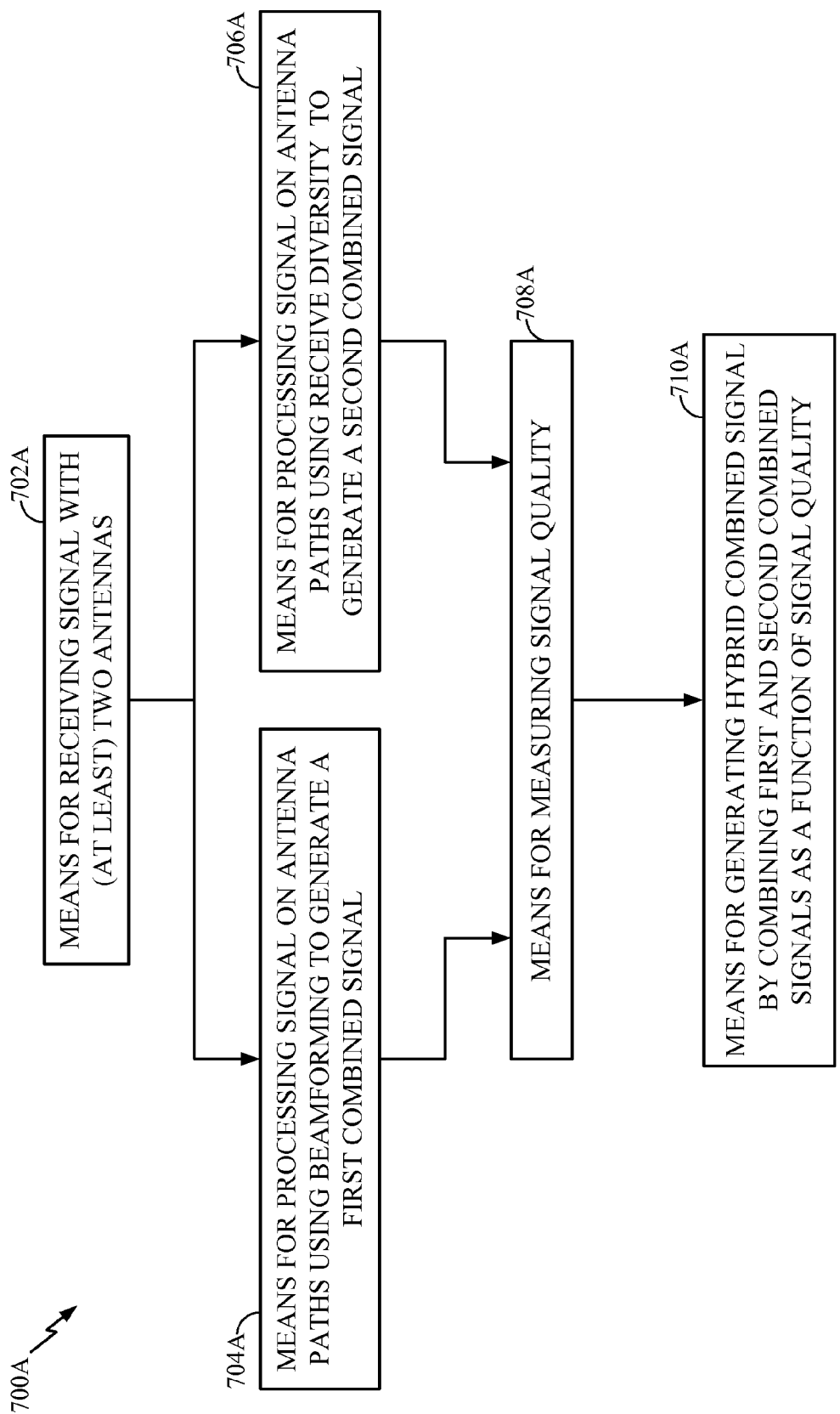
FIG. 7A illustrates example components for performing operations for hybrid receive diversity processing in accordance with certain embodiments of the present disclosure.

The operations 700 of FIG. 7, described above, may be performed by various hardware and/or software component(s) and/or module(s) corresponding to the means-plus-function blocks 700 illustrated in FIG. 7A. In other words, blocks 702 through 710 illustrated in FIG. 7 correspond to means-plus-function blocks 702A through 710A illustrated in FIG. 7A.

The hybrid combined signal may be generated using any suitable logic. For example, referring again to FIG. 4, the combined MRC and beam forming signals, $E_{MRC,k}$ and $E_{BF,k}$, may be fed into hybrid MIMO combining logic 490, which may generate a final combined signal $E_k$ based on a selection and/or combination of these signals. The hybrid MIMO combining logic 490 may generate the final combined signal $E_K$ using one or a combination of a variety of different schemes.

For example, for some embodiments, the hybrid MIMO combining logic 490 may generate the final combined signal $E_k$ based on one or more signal quality measurements of the received signals $R_{0,k}$ and $R_{1,k}$. As illustrated, the HYBRID MIMO logic 450 may include signal quality estimation logic 480 that generates a set of hybrid weights ($F_{MRC,k}$ and $F_{BF,k}$) based on a Carrier to Noise Ratio (CNR) estimation and a Carrier to Interference Ratio (CIR) estimation. The weight values may take on any suitable format, such as a matrix of values that may be applied to individual subcarrier components of the combined signal $E_{MRC,k}$ generated by the MRC combining technique or the combined signal $E_{BF,k}$ generated by beam forming.

For some embodiments, the hybrid weights may be calculated in a manner that gives more weight to either $E_{MRC,k}$ or $E_{BF,k}$, depending on the signal quality estimates. For example, if channel conditions are dominated by noise (CIR>CNR), $E_{MRC,k}$ may be weighted more heavily than $E_{BF,k}$ because MRC schemes typically perform better than beam forming (BF) schemes in noisy environments. On the other hand, if channel conditions are dominated by interference (CNR>CIR), the $E_{BF,k}$ may be weighted more heavily than $E_{MRC,k}$ because BF schemes typically perform better than MRC schemes in interference-dominated environments. For some embodiments, weights for a given sub-carrier k may be generated based on an average, for example taking a "window" of signal quality estimates around the sub-carrier k, rather than single values at the k-th sub-carrier itself.

For some embodiments, a "best selection" scheme may be utilized to generate a hybrid combined signal as a selection of the combined signal generated by the technique that results in the best overall signal. For example, a carrier to interference/noise ratio (CINR) value may be calculated for the separate combined signals and the signal with the best CINR value may be selected as the hybrid signal (e.g., by setting the appropriate weight values to "0" or "1").

Figure 8:
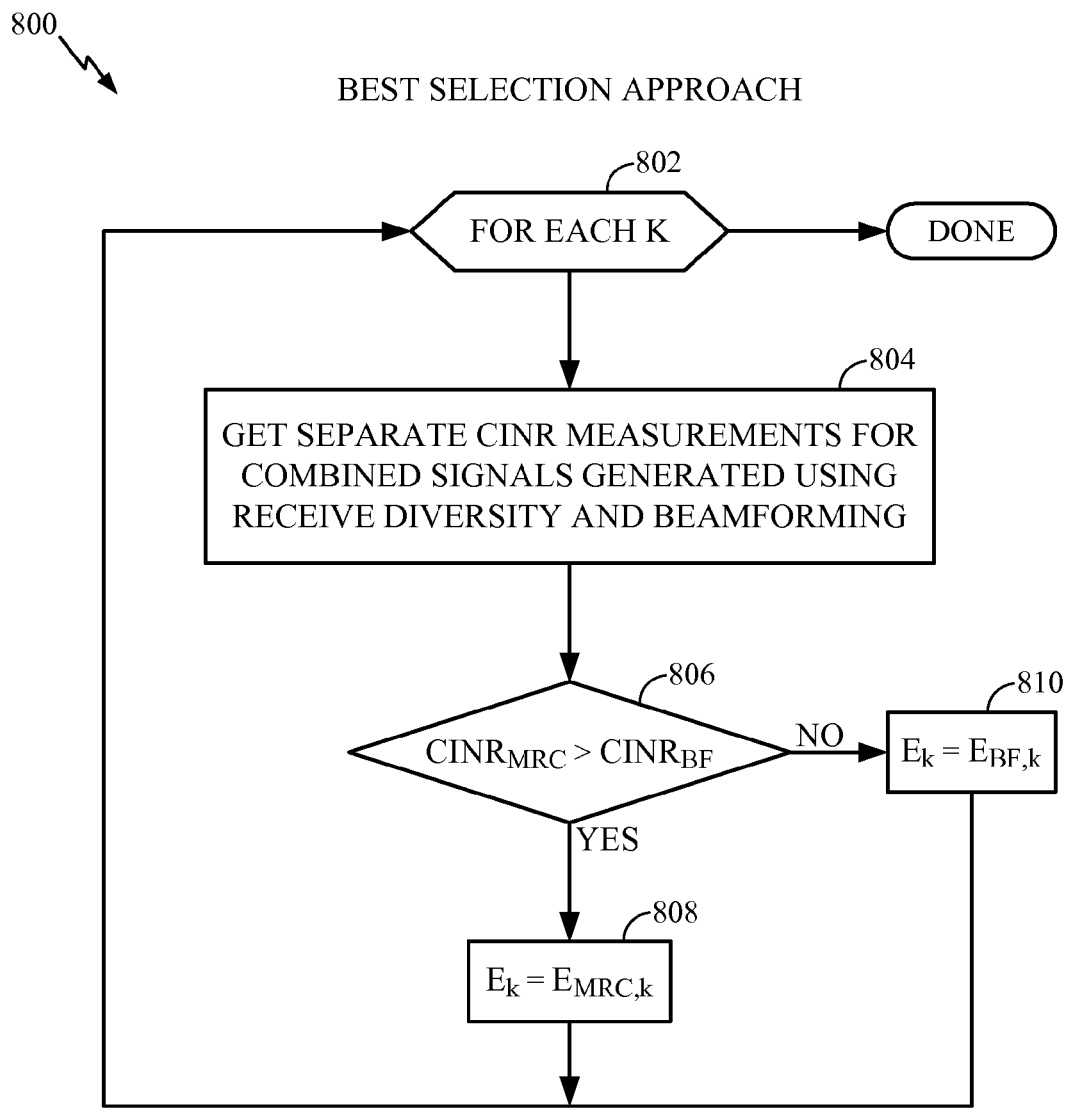
FIG. 8 illustrates example operations for a best selection hybrid receive diversity scheme in accordance with certain embodiments of the present disclosure.

FIG. 8 illustrates example operations 800 for a best selection approach to generating a hybrid combined signal, in accordance with certain embodiments. As illustrated, the operations may be performed on a sub-carrier basis. For example, at 802, a loop of operations 804-810 may be performed for each sub-carrier to select a corresponding combined signal $E_{MRC,k}$ or $E_{BF,k}$ that has the best CINR. In other words, depending on the results, a combined signal generated using one technique may be selected for some sub-carriers, while a combined signal generated using a different technique may be selected for other sub-carriers.

At 804, separate CINR measurements, $CINR_{MRC}$ and $CINR_{BF}$, are taken for combined signals using receive diversity (e.g., MRC) and beam forming techniques, respectively. If $CINR_{MRC,k}$ is greater than $CINR_{MRC,k}$ as determined at 806, $E_{MRC,k}$ may be selected as the hybrid combined signal at 808. On the other hand, if $CINR_{BF}$ is greater than $CINR_{MRC}$, $E_{BF,k}$ may be selected as the hybrid combined signal at 810. This approach may be summarized by the following equation:

$$E_k = \begin{cases} E_{MRC,k} & \text{if } CINR_{MRC,k} \geq CINR_{BF,k} \\ E_{BF,k} & \text{Else} \end{cases}, k = 1, \ldots, N \quad \text{Eq. 5}$$

Figure 9A:
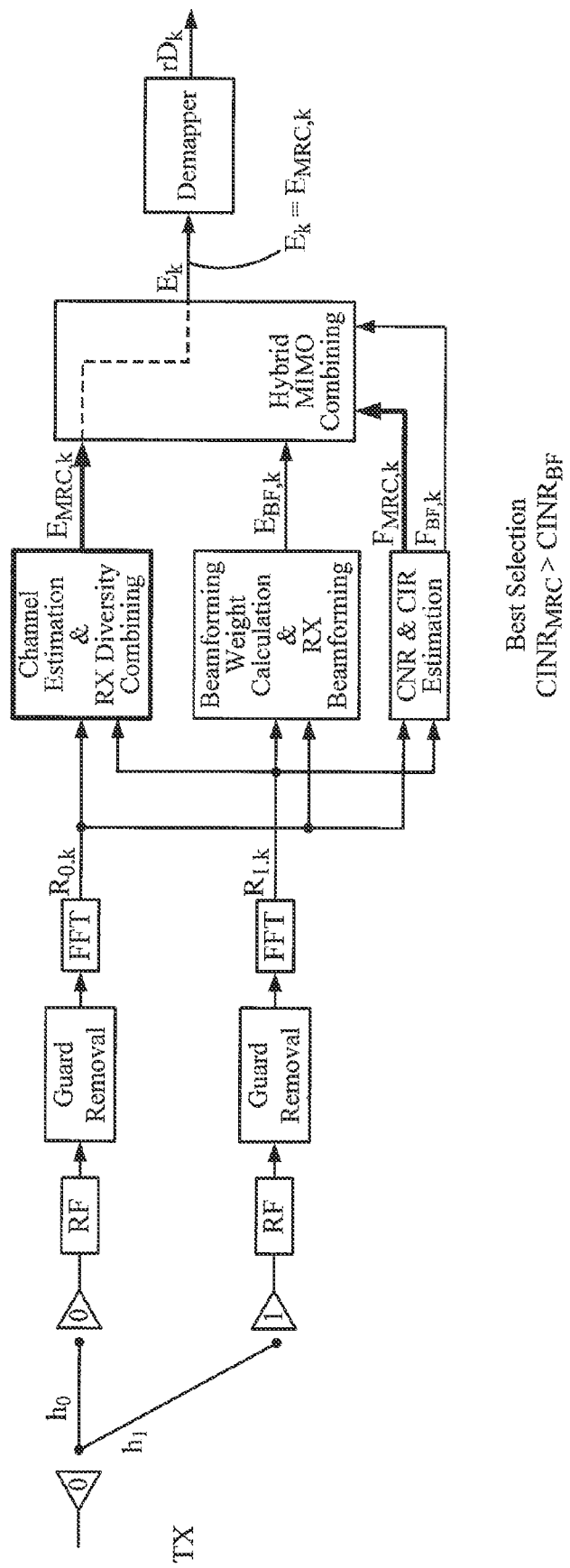
FIGS. 9A and 9B illustrate an example receiver selecting an MRC combined signal and a BF combined signal, respectively.
Figure 9B:
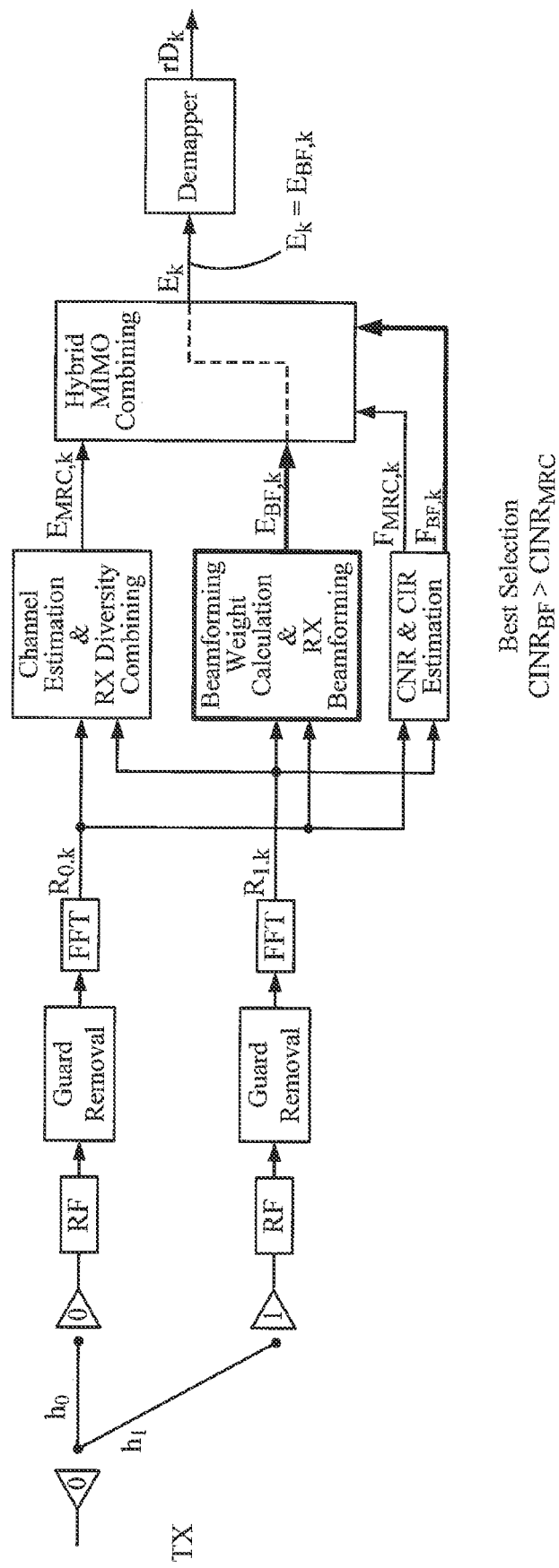

FIGS. 9A and 9B illustrate the best selection technique applied to select $E_{MRC,k}$ and $E_{BF,k}$, respectively. As illustrated in FIG. 9A, when $CINR_{MRC,k} > CINR_{BF,k}$ the hybrid weights $F_{MRC,k}$ and $F_{BF,k}$ and may be generated in a manner that effectively selects $E_{MRC,k}$ as $E_k$ and zeroes out any contribution by $E_{BF,k}$. As illustrated in FIG. 9B, when $CINR_{BF,k} > CINR_{MRC,k}$ the hybrid weights $F_{MRC,k}$ and $F_{BF,k}$ may be generated in a manner that effectively selects $E_{BF,k}$ as $E_k$ and zeroes out any contribution by $E_{MRC,k}$.

As an alternative to a best selection scheme, a variety of other hybrid combining schemes may be utilized that generate a hybrid combined signal as a function of separate combined signals generated using different combining techniques. As an example, one scheme may utilize an equation that is similar in form to the maximum ratio combining equation to generate a hybrid combined signal as a function of CINR estimates for both combined signals $E_{MRC,k}$ and $E_{BF,k}$:

$$E_k = \frac{CINR_{MRC,k} \times E_{MRC,k} + CINR_{BF,k} \times E_{BF,k}}{CINR_{MRC,k} + CINR_{BF,k}}, \quad \text{Eq. 6}$$
$$k = 1, \ldots, N$$

In this equation, $CINR_{MRC,k}$ is the CINR measurement of the k-th sub-carrier of the MRC combined signal $E_{MRC,k}$ and $CINR_{BF,k}$ is CINR of k-th sub-carrier of the BF combined signal $E_{MRC,k}$. For some embodiments, values of $CINR_{MRC,k}$ and $CINR_{BF,k}$ may also be averaged, for example, within a window of values centered at the k-th sub-carrier, rather than a single value at the k-th subcarrier itself.

As another alternative, an equal gain hybrid combining scheme may be utilized that gives equal weight to separate combined signals generated using different combining techniques. For example, such a scheme may average MRC and BF combined signals as follows:

$$E_k = \frac{E_{MRC,k} + E_{BF,k}}{2}, k = 1, \ldots, N \quad \text{Eq. 7}$$

For some embodiments, weighting applied to different combined signals may be varied to account for channel conditions. In such a scheme, the final hybrid combined signal may be generated according to the following equation:

$$E_k = \frac{F_{MRC,k} \times E_{MRC,k} + F_{BF,k} \times E_{BF,k}}{F_{MRC,k} + F_{BF,k}}, k = 1, \ldots, N \quad \text{Eq. 8}$$

In this equation, $F_{MRC,k}$ is a weighting factor applied to the k-th sub-carrier of the MRC combined signal $E_{MRC,k}$ and $F_{BF,k}$ is weighting factor applied to the k-th sub-carrier of the BF combined signal $E_{BF,k}$. As previously described, one approach to calculating the weighting factors is based on CNR and CIR channel estimations. For example, if a comparison of estimated CNR and CIR indicates the channel is dominated by noise, the MRC weight value may be made greater than the BF weight value because MRC schemes typically perform better than BF schemes in noisy environments. On the other hand, if a comparison of estimated CNR and CIR indicates the channel is dominated by interference, the BF weight value may be made greater than the MRC weight value because BF schemes typically perform better than MRC schemes in channels dominated by interference.

Hybrid MIMO TX Diversity Scheme

Certain embodiments of the present disclosure may also provide a hybrid approach to transmit diversity that also utilizes different transmit diversity techniques. For example, different transmit diversity schemes may be utilized in a manner determined as a function of signal quality fed back to a transmitter by a receiving device (e.g., a mobile station).

Figure 10:
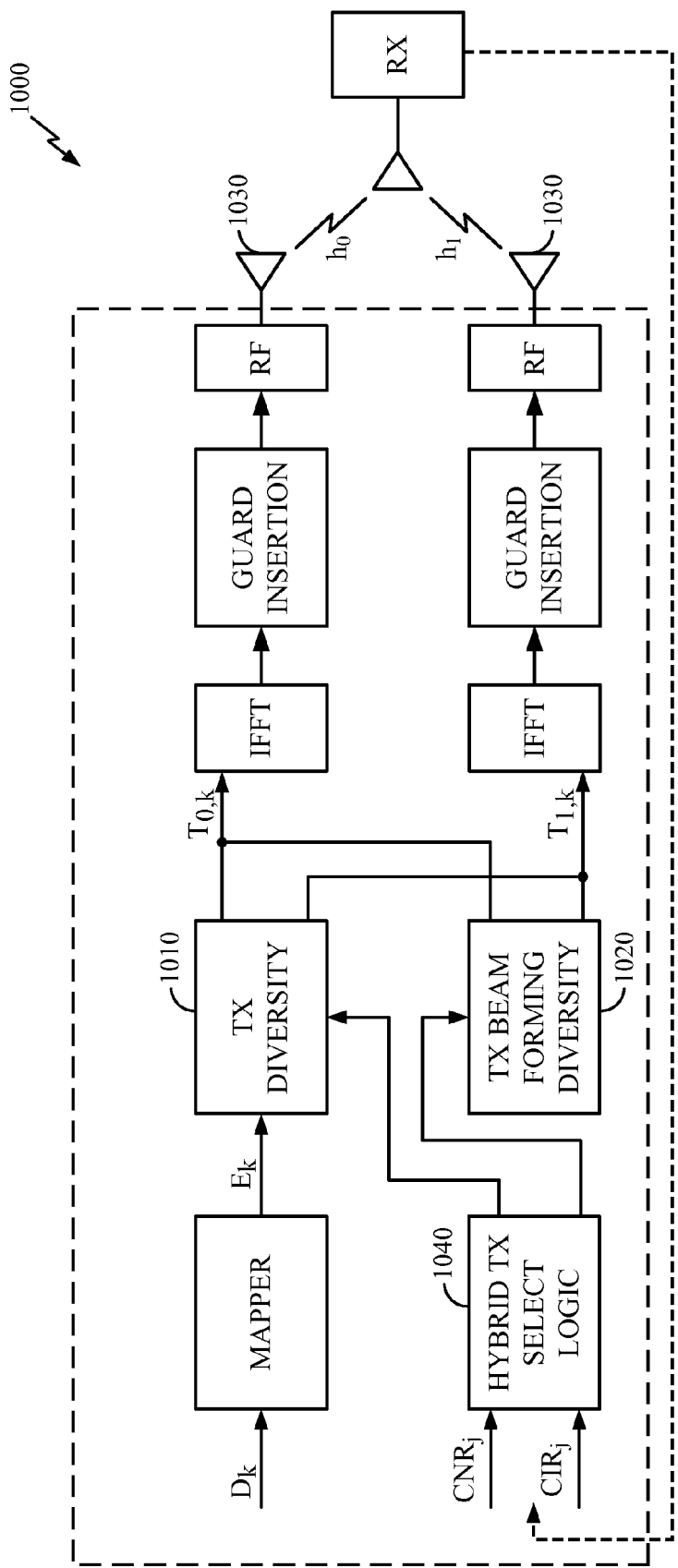
FIG. 10 illustrates an example transmitter capable of performing hybrid transmit diversity operations in accordance with certain embodiments of the present disclosure.

FIG. 10 illustrates a transmitter 1000 capable of transmitting signals utilizing a hybrid diversity transmitting scheme in accordance with embodiments of the present invention. In the illustrated example, the transmitter 1000 has two antennas 1030, while the receiver has a single antenna, so there are two possible wireless channels h0 and h1. Those skilled in the art will recognize, however, that the techniques described herein may apply in systems utilizing multiple receiver antennas and/or more than two transmit antennas. Further, some transmit diversity schemes may utilize a single transmit antenna, for example, utilizing time and/or frequency diversity. Some embodiments may combines such schemes to perform hybrid transmit diversity using a single antenna.

As illustrated in FIG. 10, the transmitter 1000 may have logic to perform transmit diversity according to different schemes. For example, the transmitter may have space time code (STC) diversity logic 1010 and TX beam forming (BF) diversity logic 1020 to generate separate transmit diversity signals according to those schemes. The transmitter may include logic to generate hybrid diversity transmit signals ($T_{0,k}$ and $T_{1,k}$) based on the signals generated by that logic. For some embodiments, such logic may generate one or more weight values and generate the transmit diversity signals by combining the signals generated by the different diversity techniques. For some embodiments, the transmit diversity signals generated by one of the techniques may be selected as the hybrid diversity signals.

For example, as illustrated in FIG. 10, Hybrid TX selector logic 1040 may be configured to generate one or more signals to select the transmit diversity signals generated by either STC diversity logic 1010 or BF diversity logic 1020, based on signal quality measurements fed back to the transmitter. For example, the Hybrid TX Selector may decide on a diversity transmitting method for a j-th receiver according to signal quality measurements received from that receiver, such as Carrier to Noise Ratio and/or Carrier to Interference Ratio for that receiver (CNRj and/or CIRj).

Figure 11:
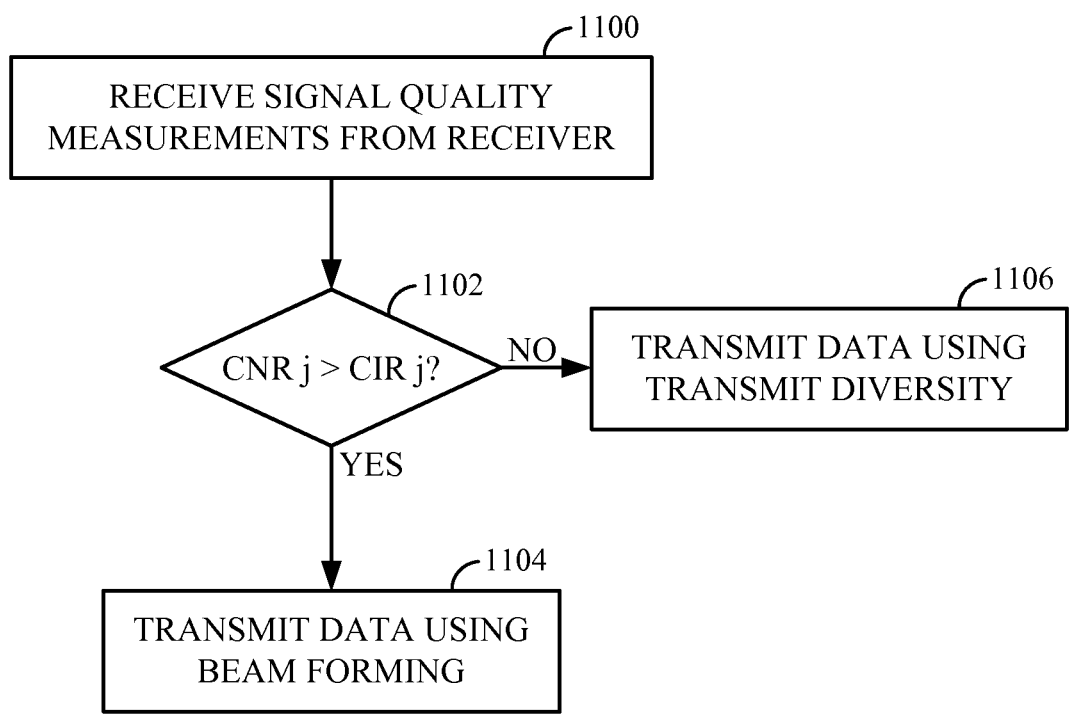
FIG. 11 illustrates example operations for hybrid transmit diversity in accordance with certain embodiments of the present disclosure.

FIG. 11 illustrates example operations 1100 for hybrid transmit diversity that may be performed, for example, by components of the transmitter 1000. The operations begin, at 1100, by receiving signal quality measurements from a receivers, such as CIR and CNR measurements.

If $CNR_j$ is greater than $CIR_j$, as determined at 1102, data may be transmitted using a beam forming scheme, at 1104, which may result in improved performance for interference-dominated channels. On the other hand, if $CIR_j$ is greater than $CNR_j$, data may be transmitted using an STC diversity scheme, at 1106, which may result in improved performance for noise-dominated channels.

Figure 12A:
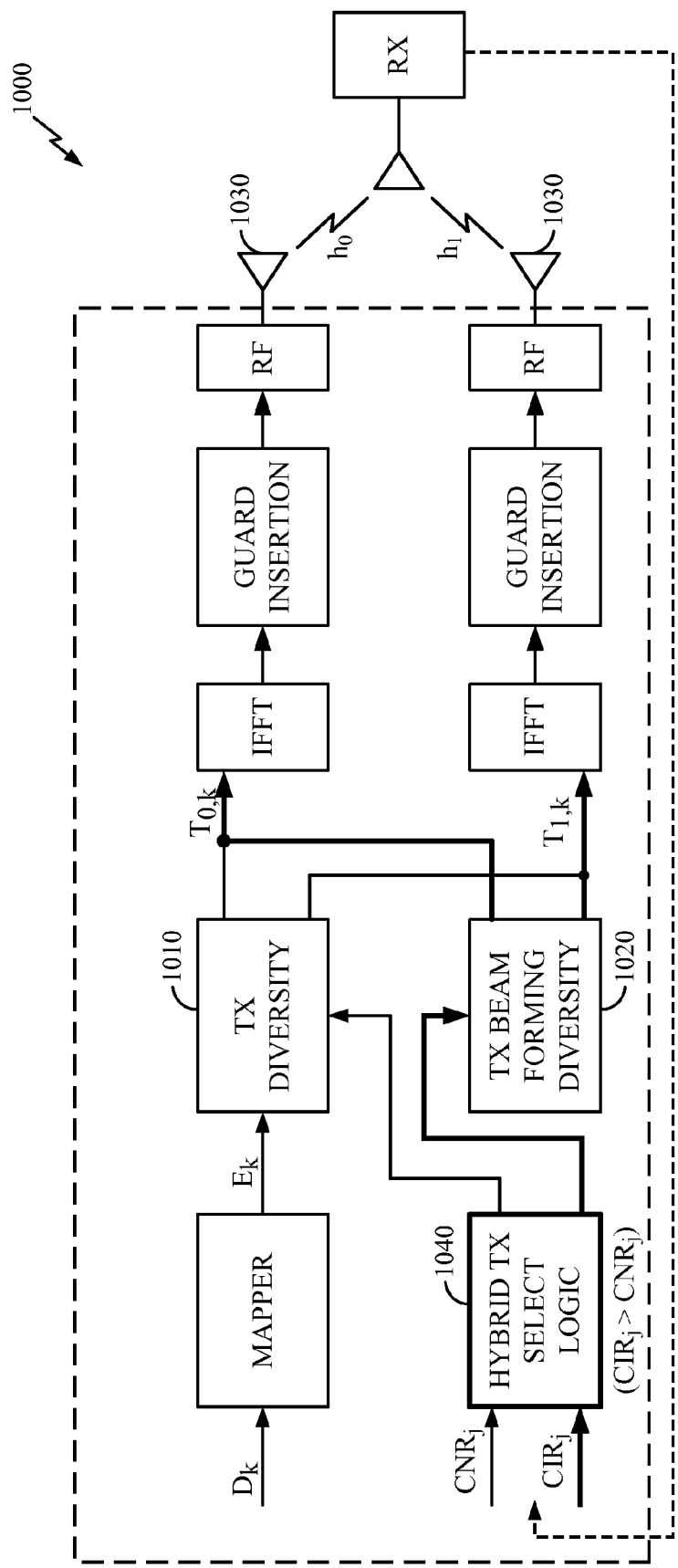
FIGS. 12A and 12B illustrate an example transmitter selecting space time coding (STC) diversity signals and BF diversity signals for transmission, respectively.
Figure 12B:
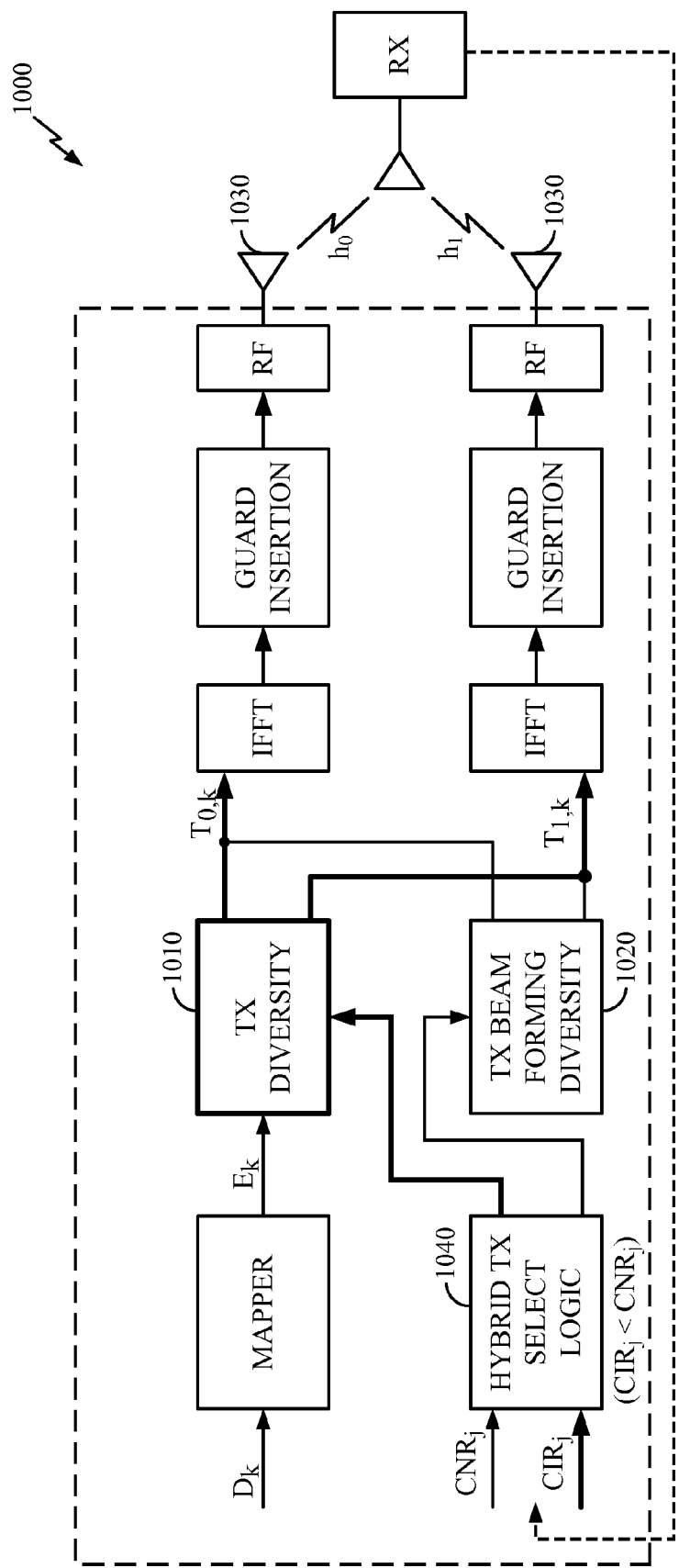

This selection approach is illustrated in FIGS. 12A and 12B and also summarized by the following equation:

$$\text{Hybrid\_TX}_k = \begin{cases} BF(TX_k) & \text{if } CNR_k > CIR_k \\ STC(TX_k) & \text{Else} \end{cases}, \quad \text{Eq. 9}$$
$$k = 1, \ldots, N$$

FIG. 12A illustrates the situation where the signal quality parameters received from the receiver indicates a noise-dominated channel environment (CIRj>CNRj). As a result, Hybrid Selection Logic 1040 may generate signals to select transmit diversity signals generated by STC diversity logic 1010. FIG. 12B illustrates the situation where the signal quality parameters received from the receiver indicates an interference-dominated channel environment ($CNR_j$>$CIR_j$). As a result, Hybrid Selection Logic 1040 may generate signals to select beam formed signals generated by BF diversity logic 1020.

The Hybrid Selection Logic may generate any suitable signals to select the appropriate diversity signals based on the signal quality measurements. For example, the Hybrid Selection Logic may generate signals that prevent the "non-selected" diversity logic from outputting its diversity signals. As another example, the Hybrid Selection Logic may generate signals to control a multiplexor (not shown) that selectively outputs the diversity signals generated by the "selected" scheme.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing receive diversity processing, comprising:
   receiving first and second signals with first and second antennas, respectively;
   combining the first and second signals using a first diversity combining scheme to generate a first combined signal, wherein the first diversity combining scheme comprises a beam forming diversity scheme that uses a set of beam forming weights to generate the first combined signal;
   combining the first and second signals using a second diversity combining scheme to generate a second combined signal;
   generating first and second weight values based on comparison of a Carrier to Noise Ratio (CNR) estimate and a Carrier to Interference Ratio (CIR) estimate for a channel carrying the first and second signals; and
   generating a hybrid combined signal as a function of a ratio of a weighted sum of the first weight value applied to the first combined signal and the second weight value applied to the second combined signal to a sum of the first and second weight values.

2. The method of claim 1, wherein the second diversity combining scheme comprises a maximum ratio combining scheme.

3. The method of claim 2, further comprising:
   generating the hybrid combined signal with a greater contribution from the first combined signal if the CNR and CIR estimates indicate that channel conditions are dominated by interference; and
   generating the hybrid combined signal with a greater contribution from the second combined signal if the CNR and CIR estimates indicate that channel conditions are dominated by noise.

4. The method of claim 1, wherein:
   generating the hybrid combined signal comprises selecting one of the first or second combined signals as the hybrid combined signal.

5. The method of claim 1, wherein the first weight value is a member of a first set of weight values and the second weight value is a member of a second set of weight values, and wherein the hybrid combined signal is generated as a function of a weighted sum of the first set of weight values applied to the first combined signal and the second set of weight values applied to the second combined signal.

6. An apparatus for performing receive diversity processing, comprising:
a first combine logic module configured to combine first and second signals received with first and second antennas, respectively, using a first diversity combining scheme to generate a first combined signal, wherein the first diversity combining scheme comprises a beam forming diversity scheme that uses a set of beam forming weights to generate the first combined signal;
a second combine logic module configured to combine the first and second signals using a second diversity combining scheme to generate a second combined signal;
a weight generation logic module configured to generate first and second weight values based on comparison of a Carrier to Noise Ratio (CNR) estimate and a Carrier to Interference Ratio (CIR) estimate for a channel carrying the first and second signals; and
a hybrid logic module configured to generate a hybrid combined signal as a function of a ratio of a weighted sum of the first weight value applied to the first combined signal and the second weight value applied to the second combined signal to a sum of the first and second weight values.

7. The apparatus of claim 6, wherein the second diversity combining scheme comprises a maximum ratio combining scheme.

8. The apparatus of claim 7, wherein the hybrid logic module is further configured to:
generate the hybrid combined signal with a greater contribution from the first combined signal if the CNR and CIR estimates indicate that channel conditions are dominated by interference, and
generate the hybrid combined signal with a greater contribution from the second combined signal if the CNR and CIR estimates indicate that channel conditions are dominated by noise.

9. The apparatus of claim 6, wherein:
the hybrid logic module is configured to generate the hybrid combined signal by selecting one of the first or second combined signals as the hybrid combined signal.

10. The apparatus of claim 6, wherein the first weight value is a member of a first set of weight values and the second weight value is a member of a second set of weight values, and wherein the hybrid logic module is configured to generate the hybrid combined signal as a function of a weighted sum of the first set of weight values applied to the first combined signal and the second set of weight values applied to the second combined signal.

11. An apparatus for performing receive diversity processing, comprising:
means for receiving first and second signals with first and second antennas, respectively;
means for combining the first and second signals using a first diversity combining scheme to generate a first combined signal, wherein the first diversity combining scheme comprises a beam forming diversity scheme that uses a set of beam forming weights to generate the first combined signal;
means for combining the first and second signals using a second diversity combining scheme to generate a second combined signal;
means for generating first and second weight values based on comparison of a Carrier to Noise Ratio (CNR) estimate and a Carrier to Interference Ratio (CM) estimate for a channel carrying the first and second signals; and
means for generating a hybrid combined signal as a function of a ratio of a weighted sum of the first weight value applied to the first combined signal and the second weight value applied to the second combined signal to a sum of the first and second weight values.

12. The apparatus of claim 11, wherein the second diversity combining scheme comprises a maximum ratio combining scheme.

13. The apparatus of claim 12, wherein the means for generating the hybrid combined signal is further configured to:
generate the hybrid combined signal with a greater contribution from the first combined signal if the CNR and CIR estimates indicate that channel conditions are dominated by interference, and
generate the hybrid combined signal with a greater contribution from the second combined signal if the CNR and CIR estimates indicate that channel conditions are dominated by noise.

14. The apparatus of claim 11, wherein:
the means for generating the hybrid combined signal is configured to select one of the first or second combined signals as the hybrid combined signal.

15. The apparatus of claim 11, wherein the first weight value is a member of a first set of weight values and the second weight value is a member of a second set of weight values, and wherein the means for generating the hybrid combined signal is configured to generate the hybrid combined signal as a function of a weighted sum of the first set of weight values applied to the first combined signal and the second set of weight values applied to the second combined signal.

16. A wireless receiving device capable of performing receive diversity processing, comprising:
first and second antennas for receiving first and second signals, respectively;
a first combine logic module configured to combine the first and second signals using a first diversity combining scheme to generate a first combined signal, wherein the first diversity combining scheme comprises a beam forming diversity scheme that uses a set of beam forming weights to generate the first combined signal;
a second combine logic module configured to combine the first and second signals using a second diversity combining scheme to generate a second combined signal;
a weight generation logic module configured to generate first and second weight values based on comparison of a Carrier to Noise Ratio (CNR) estimate and a Carrier to Interference Ratio (CIR) estimate for a channel carrying the first and second signals; and
a hybrid logic module configured to generate a hybrid combined signal as a function of a ratio of a weighted sum of the first weight value applied to the first combined signal and the second weight value applied to the second combined signal to a sum of the first and second weight values.

17. The device of claim 16, wherein the second diversity combining scheme comprises a maximum ratio combining scheme.

18. The device of claim 17, wherein the hybrid logic module is further configured to:
generate the hybrid combined signal with a greater contribution from the first combined signal if the CNR and CIR estimates indicate that channel conditions are dominated by interference; and generate the hybrid combined signal with a greater contribution from the second combined signal if the CNR and CIR estimates indicate that channel conditions are dominated by noise.

19. The apparatus of claim 16, wherein the first weight value is a member of a first set of weight values and the second weight value is a member of a second set of weight values, and wherein the hybrid logic module is configured to generate the hybrid combined signal as a function of a weighted sum of the first set of weight values applied to the first combined signal and the second set of weight values applied to the second combined signal.

20. A computer-program product for performing receive diversity processing comprising a non-transitory computer-readable medium having a set of instructions stored thereon, the set of instructions being executable by one or more processors, and the set of instructions comprising:
    instructions for receiving first and second signals with first and second antennas, respectively;
    instructions for combining the first and second signals using a first diversity combining scheme to generate a first combined signal, wherein the first diversity combining scheme comprises a beam forming diversity scheme that uses a set of beam forming weights to generate the first combined signal;
    instructions for combining the first and second signals using a second diversity combining scheme to generate a second combined signal;
    instructions for generating first and second weight values based on comparison of a Carrier to Noise Ratio (CNR) estimate and a Carrier to Interference Ratio (CIR) estimate for a channel carrying the first and second signals; and
    instructions for generating a hybrid combined signal as a function of a ratio of a weighted sum of the first weight value applied to the first combined signal and the second weight value applied to the second combined signal to a sum of the first and second weight values.

21. The computer-program product of claim 20, wherein the second diversity combining schemes comprises a maximum ratio combining scheme.

22. The computer-program product of claim 21, further comprising:
    instructions for generating the hybrid combined signal with a greater contribution from the first combined signal if the CNR and CIR estimates indicate that channel conditions are dominated by interference; and
    instructions for generating the hybrid combined signal with a greater contribution from the second combined signal if the CNR and CIR estimates indicate that channel conditions are dominated by noise.

23. The computer-program product of claim 20, wherein the first weight value is a member of a first set of weight values and the second weight value is a member of a second set of weight values, and wherein the instructions for generating the hybrid combined signal comprise instructions for generating the hybrid combined signal as a function of a weighted sum of the first set of weight values applied to the first combined signal and the second set of weight values applied to the second combined signal.

\* \* \* \* \*